No. 695,626. Patented Mar. 18, 1902.
W. L. ROOT.
MULTIPLYING ATTACHMENT FOR CAMERAS.
(Application filed Feb. 16, 1901.)
(No Model.) 2 Sheets—Sheet 2.
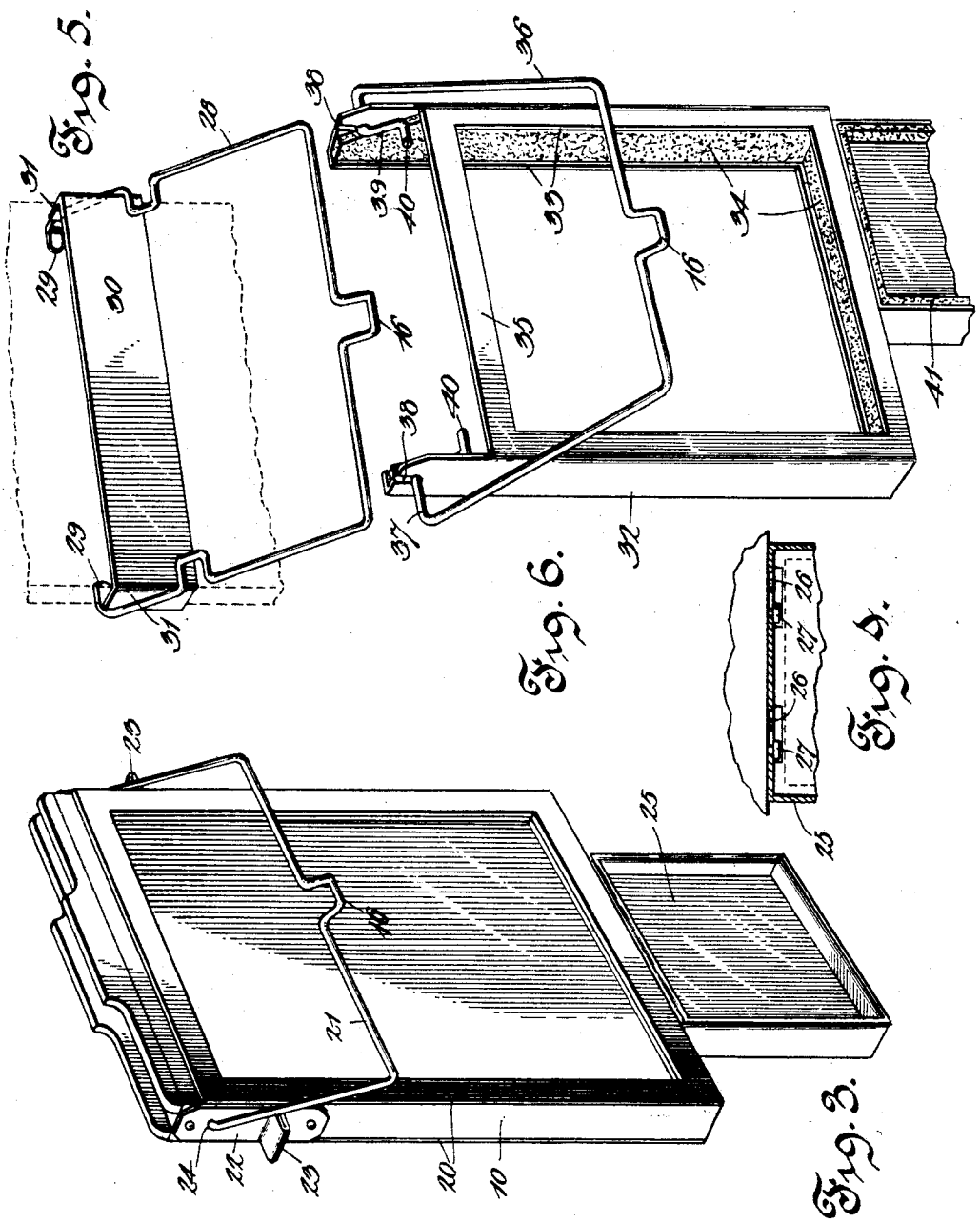

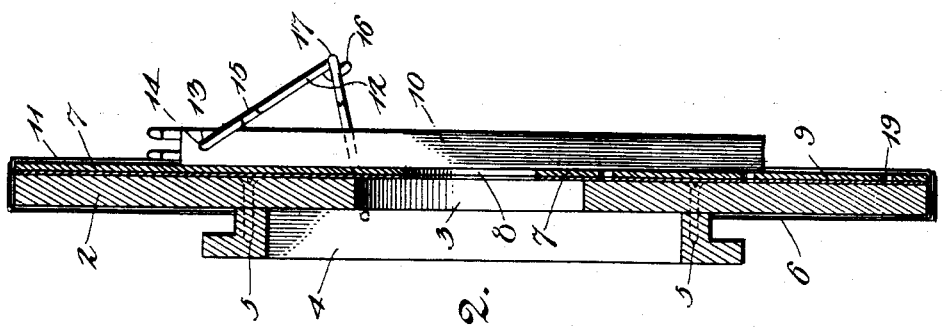
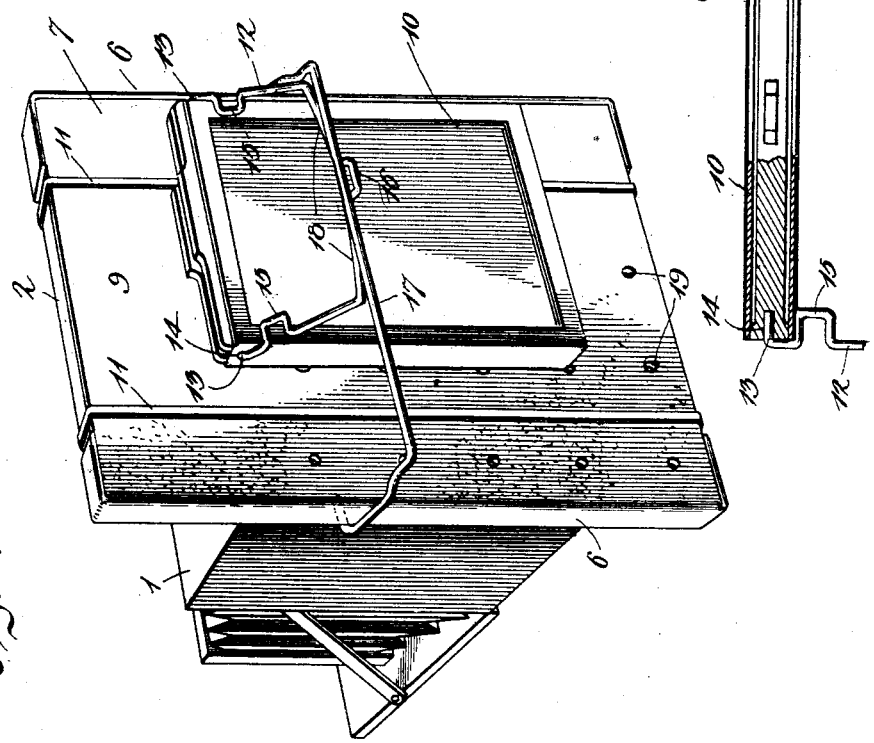

UNITED STATES PATENT OFFICE.

WAYLAND L. ROOT, OF SPOKANE, WASHINGTON.

MULTIPLYING ATTACHMENT FOR CAMERAS.

SPECIFICATION forming part of Letters Patent No. 695,626, dated March 18, 1902.

Application filed February 16, 1901. Serial No. 47,633. (No model.)

*To all whom it may concern:*

Be it known that I, WAYLAND L. ROOT, a citizen of the United States, residing at Spokane, in the county of Spokane and State of Washington, have invented a new and useful Multiplying Attachment for Cameras, of which the following is a specification.

This invention relates to photographic cameras, and has for its object to provide improved means in the nature of an attachment for obtaining a plurality of exposures upon a single sensitive plate, so as to use all of the area thereof without overlapping the exposures. It is furthermore designed to arrange for connecting the device to a camera by substituting a part thereof in place of the usual focusing-glass and finally to provide improved means for adjustably supporting a sensitive plate upon the outer side of the device, so as to be accurately adjusted across the exposure-opening, whereby different parts of the plate may be used at each exposure.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a perspective view showing the present device applied to the back of a camera. Fig. 2 is a central longitudinal sectional view of the attachment, the plate-holder being in elevation. Fig. 3 is a perspective view of a modified form of plate-holder carrier. Fig. 4 is a detail sectional view showing the detachable connection between the plate-holder and the focusing-glass illustrated in Fig. 3. Fig. 5 is a detail view of another modified form of plate-holder carrier, the plate-holder being partly indicated in dotted lines. Fig. 6 is a perspective view of a further modified form of plate-holder carrier, the plate-holder being omitted. Fig. 7 is a detail top plan view of a plate-holder and the carrier therefor, portions of the plate-holder frame being broken away to show the connection between the carrier and the plate-holder.

Like characters of reference designate corresponding parts in all of the figures of the drawings.

Referring at first more particularly to Fig. 1 of the drawings, wherein the numeral 1 designates any ordinary camera, it will be seen that the present attachment has a substantially rectangular plate-like back or body 2, which is designed to be fitted flat against the back of a camera and is of considerably greater area than said back of the camera, so as to project at each side thereof to provide for the adjustment of the plate-holder in directions at right angles across the body or back.

As best indicated in Fig. 2, it will be noted that the plate or body 2 is provided with a central opening 3, which is designed to be alined with the lens of the camera and forms the exposure-opening of the attachment. Surrounding this opening and spaced at a suitable distance therefrom is a substantially rectangular frame 4, which is designed to be fitted in the place of the focusing-glass of the camera, and thereby form the sole supporting connection between the attachment and the camera. Also this arrangement brings the plate or body 2 close up to the back of the camera and, in fact, usually lies snugly in engagement therewith. This supporting and connecting frame is detachably connected to the body by means of suitable detachable fastenings 5, so that different sizes and shapes of frames may be applied to a single attachment to adapt the same to the various different makes of cameras. It will of course be understood that the frames will vary slightly in form and construction to accommodate the same to the cameras now in general use. Metal strips 6 are secured to opposite edges of the plate or body and are projected at the front and rear sides of the body, so as to form marginal flanges.

It will be understood that the opening in the body is the maximum exposure-opening, and in order that this opening may be reduced there is provided a plurality of reducing-frames, one of which has been shown at 7 in the form of a rectangular card, which is of a size to snugly fit the rear or outer side of the body between the marginal flanges thereof and is provided with a central opening 8 to correspond with the opening in the body, the former opening being equal to or smaller than the latter opening and also of any desired shape. The outer or exposed side of this card has a felt or other suitably soft and yieldable facing 9, preferably of black or dark color, so as to form a light-excluding joint between the card and the plate-holder 10, which is adjustably held in contact therewith, as will be hereinafter explained. Suitable fastenings—as, for instance, elastic bands 11—embrace the body 2 and the card, so as to removably connect the latter to the former, whereby cards having different exposure-openings may be readily interchanged or substituted so as to accommodate a single attachment for taking pictures of various shapes and sizes.

The plate-holder shown in Figs. 1, 2, and 7 is of common or ordinary form, and for adjustably supporting the same upon the rear face of the attachment there is provided a carrier in the form of a swinging bail 12, formed from a single length of wire bent into substantially U shape and having its terminals bent laterally inward, so as to form the respective opposite pivot-pins or journals 13, which are designed to be detachably sprung into corresponding openings or sockets 14, formed in the opposite sides of the frame of the plate-holder and adjacent to one end thereof, whereby the bail-shaped carrier embraces the plate-holder transversely and normally hangs downwardly across the outer side thereof. The respective sides of the bail or carrier have an intermediate bearing or engagement upon the respective sides of the plate-holder frame by means of lateral inwardly-directed projections 15, formed by bends or kinks in the side arms of the bail and located adjacent to the pivotal outer terminals thereof, so that when the bail is swung toward the plate-holder the lateral projections strike against the same, and thereby support the bail in an outwardly and downwardly inclined position. The intermediate portion of the outer transverse free end of the bail is provided with an outwardly bent or kinked catch or keeper 16 for engagement by a substantially U-shaped clamp 17, that embraces the plate-holder and the body of the attachment, each end of the clamp being hooked to embrace the respective edges of the body, and thereby secure the plate-holder to the body. The intermediate transverse portion of the clamp extends across and in engagement with the upper side of the catch or keeper 16, whereby the lateral projections 15 are drawn tightly against the plate-holder. In applying the clamp it is slipped upon the body at one end thereof and then slid across the inclined side arms of the bail, so as to gradually draw the plate-holder against the body with a spring action, due to the pressure upon the bail. The opposite portions 18 of the end of the bail are inclined downwardly or laterally, so as to dispose the keeper 16 slightly at one side of the sides of the bail, whereby the clamp lies in a seat formed between the portions 18 and the catch or keeper, so as to prevent accidental displacement of the clamp from the bail. The bail may be released by sliding the clamp upon the body and away from the bail. By this arrangement the plate-holder may be adjusted in directions at right angles across the body, so as to expose every portion of the sensitive plate to the exposure-opening. By having the bail pivotally swung from one end of the plate-holder it may be swung to opposite sides thereof, whereby the holder may be reversed in the case of a double plate-holder to expose both plates without removing the holder from the bail-shaped carrier. It will be observed that the bail forms a frictional surface, which lies at an angle to the seat for the photographically-sensitive member and also to the intermediate portion of the clamp which engages the same, so as to draw the carrier against the body when the clamp is forced across and in contact with the inclined bail. Furthermore, a bail to form such an inclined frictional surface is strong, durable, light, inexpensive, and readily applied and also being elastic insures a strong frictional contact between the bail and the clamp. In the form shown in Fig. 3 the bail has the advantage of being capable of being swung to opposite sides of a double plate-holder, as hereinbefore set forth.

In order that the plate-holder may be accurately adjusted, so as not to overlap any of the exposures, the reducing frame or card is provided with a diagram for coöperation with the plate-holder and consisting of rows of perforations 19, formed through the card and arranged parallel, thereby providing rows intersecting each other at right angles. The plate-holder is applied to the card so that one edge is in line with one of the rows of perforations and another edge is alined with a row that crosses the former row, and by moving the plate-holder in either direction to the next adjacent row of perforations a new exposure may be had, which lies close to but does not overlap the previous exposure. Thus by moving the plate-holder regularly in one direction and then shifting the same laterally to the next adjacent row of perforations the entire surface of the plate may be accurately exposed. It is preferred to employ perforations for marking the diagram, as perforations are readily discernible and cannot be obliterated by the wearing action of the plate-holder in adjusting the same across the diagram-card. Moreover, it would be difficult to mark a diagram upon the felt or similar surface of the card in such manner as to be perfectly plain and discernible. It will of course be understood that the cards have the diagrams or perforations arranged according to the size and shape of the exposure-opening thereof, so that no mistake can be made in the adjustment of the plate-holder.

By having the bail-shaped carrier detachably sprung into connection with the plate-holder it may be removed therefrom and applied to another holder, so that one such bail is sufficient for each attachment, as it may be applied to each holder that is employed. Moreover, the bail may be applied to a focusing-plate in the same manner as applied to the plate-holder, whereby the same carrier serves for the plate-holders and the focusing-glass, which is a very advantageous and convenient feature of the present invention.

With respect to the modified forms of plate-holder carriers reference is first had to Fig. 3, in which the plate-holder is the same as usual and the swinging bail 21 is a substantial duplicate of the hereinbefore-described bail, with the exception that it does not have the lateral intermediate projections, and in place thereof the plate-holder is provided with lateral projections to be engaged by the arms of the bail. Each projection is formed by a metallic plate 22, secured to the edge of the plate-holder and having its intermediate portion bent or folded so as to form a lateral outwardly-directed lug or projection 23, against which the adjacent arm or side of the bail is designed to strike. The plate is also provided with a perforation 24, located above the shoulder and designed for the detachable reception of the adjacent terminal pivot-pin or journal of the bail, as hereinbefore described. In this form the bail is also designed to be swung to opposite sides of the frame when applied to a double plate-holder.

In some instances it may be desirable to have a focusing-glass detachably carried by the plate-holder, and to provide for such a contingency such an arrangement has been shown in Figs. 3 and 4, in which the frame of the ground glass or focusing-glass 25 is provided with a pair of keyhole slots or openings 26 for detachable engagement with a pair of headed studs or fastenings 27, projected laterally outward from the frame of the plate-holder, so that the glass may lie in the plane of the holder.

The form of carrier shown in Fig. 5 has a bail 28, substantially the same as shown in Figs. 1, 2, and 7, with the exception that the terminal lateral projections 29 are flattened and there is a flat metallic cross-bar 30 connecting the side arms of the bail and located between the intermediate lateral projections thereof and the terminal projections, the bar also having terminal transverse flanges 31, which are snugly held between the respective inner and terminal projections. By this arrangement the terminal projections coöperate with the cross-bar to form a seat for the removable reception of a plate-holder, (indicated in dotted lines.) When this form of carrier is employed, the terminal projections 29, corresponding to the pivot-pins of the other forms of carrier, bind against the inner side of the plate-holder, while the cross-bar binds against the outer side of the holder, thereby connecting the carrier and the plate-holder. In all of the forms of the carrier there is a terminal and an intermediate bearing against the plate-holder frame on the part of each side arm of the bail.

As shown in Fig. 6, it is designed to provide still another form of carrier, consisting of a substantially rectangular metallic frame 32, which is open at one end for the reception of a plate-holder and is also provided with opposite inner marginal flanges 33, forming internal marginal grooves for each side of the frame, there being a suitable packing-strip 34 fitted in the back of each groove to insure a tight fit of the plate-holder. The flanges upon the outer side of the frame terminate short of the open end of the latter, and at this point a cross-bar 35 extends across the frame to stiffen the latter. A swinging bail 36 has its opposite end portions bent laterally inward to form the journals or pivot-pins 37, that lie at the bottoms or inner ends of the respective corresponding slots 38, formed in the ends of the sides of the frame, at the open end thereof. The inner end of each journal is bent inwardly in substantially the same direction as the adjacent side or arm of the bail to form a crank-arm 39, and a free terminal of this arm is bent laterally toward the opposite side of the frame into a projection or shoulder 40, which is designed to bear against the outer side of the plate-holder when the bail is held by the clamp, as hereinbefore set forth. It will be observed that the adjacent packing-strip is cut away to permit of the swinging movement of the crank-arm 39. Moreover, this form of carrier, or rather the bail thereof, has a terminal and intermediate bearing for each side or arm thereof. A focusing-glass 41 may be carried by the frame 32, if desired, and may be permanently or detachably connected thereto.

In Fig. 3 of the drawings the plate-holder is shown as provided upon opposite faces with the respective marginal packing-strips 20, of some suitably elastically yieldable material, so that the plate-holder may be applied directly against the back or body 2 when not provided with a diagram-card, or, in other words, when the back or body has not a soft yieldable packing-surface, in order that the light may be excluded from the sensitive plate. Furthermore, the inwardly-directed lateral projections 15 (shown in Fig. 1) are dispensed with, for the reason that such projections would press against the packing-strips and soon damage the same sufficiently to admit light to the sensitive plate. It will thus be understood that when the back or body has a packing-surface it is not necessary to have packing-strips upon the plate-holder and the bail shown in Fig. 1 may be used, and in the event of the packing-surface being omitted from the body a plate-holder having packing-strips is used, with the form of bail shown in Fig. 3 of the drawings. Although possible, it is not designed to use a plate-holder having packing-strips when the body is also provided with a packing-surface.

What is claimed is—

1. A camera, having a multiple-exposure attachment, comprising a body of greater area than that of the back of the camera, and having an exposure-opening, a frame carried by the front of the body, surrounding the exposure-opening thereof, and detachably fitted to the camera in the place of the usual focusing-glass, thereby forming a supporting connection between the attachment and the camera, and means for adjustably supporting a photographic plate upon the outer or rear side of the body.

2. A multiple-exposure attachment for cameras, comprising a plate-like body, having an exposure-opening, a frame carried by the front of the body, surrounding the exposure-opening, and constructed to take the place of the usual focusing-glass of a camera, means for interchangeably connecting a plurality of such frames to the body, and means for adjustably supporting a photographic plate upon the outer or rear side of the body.

3. A multiple-exposure attachment for cameras, comprising a body, having an exposure-opening, a diagram-card fitted to the outer or rear side of the body, and provided with a soft or yieldable outer packing-face, there being a plurality of perforations formed through the card and arranged in a predetermined order to form a diagram, a plate-holder carrier and means for adjustably supporting said carrier upon and against the outer packing-face of the card and in coöperative relation to the perforations.

4. In a multiple-exposure device for cameras, the combination of a body having an exposure-opening, a carrier for a photographically-sensitive member, and a separable frictional connection between the members, one of the latter having a frictional surface which is inclined with respect to the plane of the seat for a sensitive member.

5. In a multiple-exposure device for cameras, the combination of a body having an exposure-opening, a carrier for a photographically-sensitive member, one of these parts having a frictional surface which is inclined with respect to the plane of the seat for a sensitive member, and a fastening device connecting the parts and in frictional engagement with the inclined surface.

6. In a multiple-exposure device for cameras, the combination of a body having an exposure-opening, a carrier for a photographically-sensitive member, embodying an outer frictional portion which is inclined with respect to the plane of the seat for a sensitive member, and a fastening having a slidable connection with the body and in frictional engagement with the inclined portion of the carrier.

7. In a multiple-exposure device for cameras, the combination of a body having an exposure-opening, a carrier for a photographically-sensitive member, embodying an outer frictional portion which is inclined with respect to the plane of the seat for a sensitive member, and a substantially U-shaped clamp-fastening having its intermediate portion constructed for frictional engagement with the inclined portion of the carrier, and its opposite ends provided with slidable connections with the body.

8. In a multiple-exposure device for cameras, a carrier for a photographically-sensitive member, embodying a frictional portion which is inclined with respect to the plane of the seat for a sensitive member and formed by a bail having its opposite ends fixed and its intermediate portion inclined across and away from the plane of the seat for a sensitive member.

9. In a multiple-exposure device for cameras, a carrier for a photographically-sensitive member, embodying an outer frictional portion which is inclined with respect to the seat for a sensitive member, and formed by a bail having its opposite ends fixed, and an intermediate brace device to support the bail at an inclination to the plane of the seat for a photographically-sensitive member.

10. In a multiple-exposure device for cameras, a carrier for a photographically-sensitive member, embodying a frictional portion which is adjustable to opposite sides of the seat for the sensitive member and inclined with respect to the plane of said seat, and formed by a bail having its opposite ends pivotally supported and constructed to be swung to opposite sides of the seat for a sensitive member, there being an intermediate brace to support the bail in its inclined position at either side of said seat.

11. A plate-holder having an inclined frictional portion disposed at an angle to the plane of the seat for a plate, and formed by a bail having its opposite ends connected to the holder, and its opposite side members provided with corresponding inwardly-directed lateral projections normally lying against the adjacent sides of the holder to form braces for supporting the bail at an angle to the seat for a plate.

12. A plate-holder having an inclined frictional portion disposed at an angle to the plane of the seat for a photographically-sensitive member, and formed by a bail having its opposite ends pivotally connected to the holder, and its opposite side portions having corresponding intermediate inwardly-bent projections normally lying against the adjacent sides of the plate-holder to incline the bail with respect to the plane of the seat for a sensitive plate.

13. In a multiple-exposure device for cameras, the combination with a body having an exposure-opening, of a plate-holder carrier, having a bail which is inclined away from the body, and a substantially U-shaped clamp to extend transversely across the bail, and having its opposite ends constructed for adjustably-slidable engagement with the body.

14. In a multiple-exposure device for cameras, the combination with a body, having an exposure-opening, of a plate-holder carrier, having a bail, which is inclined away from the back or body, and has its intermediate end portion provided with a lateral projection, and a substantially U-shaped clamp to lie transversely across the projection, and having its opposite ends constructed to slidably embrace the opposite edges of the body.

15. In a multiple-exposure device for cameras, the combination with a body, having an exposure-opening therein, of a plate-holder carrier, having a pivotal bail, which is constructed to be swung to opposite sides of a plate-holder, there being an intermediate engagement between the side arms of the bail and the plate-holder, and a substantially U-shaped clamp to lie across the bail, and having its opposite ends constructed to slidably embrace the opposite edges of the body.

16. A multiple-exposure attachment for cameras, comprising a body having an exposure-opening formed therein, a plate-holder, having a marginal packing-strip upon one side thereof, a bail-shaped carrier carried by the plate-holder and inclined transversely across and away from the same, and a clamp extending across the carrier and detachably connected to the body.

17. In a multiple-exposure device for cameras, the combination with a body having an exposure-opening, of a plate-holder carrier, having a bail, the opposite ends of which are connected to the carrier, and the opposite sides having corresponding intermediate bearings upon the carrier, whereby the bail is inclined away therefrom, and a yoke-shaped clamp, having its intermediate portion lying across and against the outer side of the outer end portion of the bail, and its opposite ends constructed for detachable engagement with the body.

18. A plate-holder having an inclined frictional portion disposed at an angle with respect to the seat for a sensitive plate, and formed by a bail having its opposite sides embracing opposite edges of the holder, and its opposite ends pivotally connected to the respective edges of the holder and at one end thereof, the bail being capable of a swinging movement to opposite sides of the plate-holder, and the opposite sides of the bail being provided with corresponding brace devices constructed for engagement with either side of the plate-holder to support the bail in an inclined position.

19. A plate-holder having an inclined frictional portion disposed at an angle to the seat for a sensitive plate, and formed by a bail having its opposite ends connected to the holder, and means for holding the bail inclined outwardly from its connection with the holder.

20. A plate-holder having an inclined frictional portion disposed at an angle to the seat for a sensitive plate, and formed by a swinging bail having its opposite ends sprung into openings formed in opposite edges of the plate-holder and adjacent to one end thereof, whereby the bail is capable of a swinging movement to opposite sides of the holder the opposite sides of the bail having corresponding intermediate brace devices for engagement with the holder at either side thereof to incline the bail away from the holder.

In testimony that I claim the foregoing as my own I have hereto affixed my signature in the presence of two witnesses.

WAYLAND L. ROOT.

Witnesses:
I. C. MAJOR,
HARRY VALLYN.